Feb. 20, 1940.  S. B. HEATH ET AL  2,190,922
METHOD OF COMMINUTING FUSIBLE MATERIALS SUCH AS SULPHUR
Filed Oct. 7, 1936  2 Sheets-Sheet 1

INVENTORS
Sheldon B. Heath
BY Forest R. Minger
Griswold & Burdick
ATTORNEYS

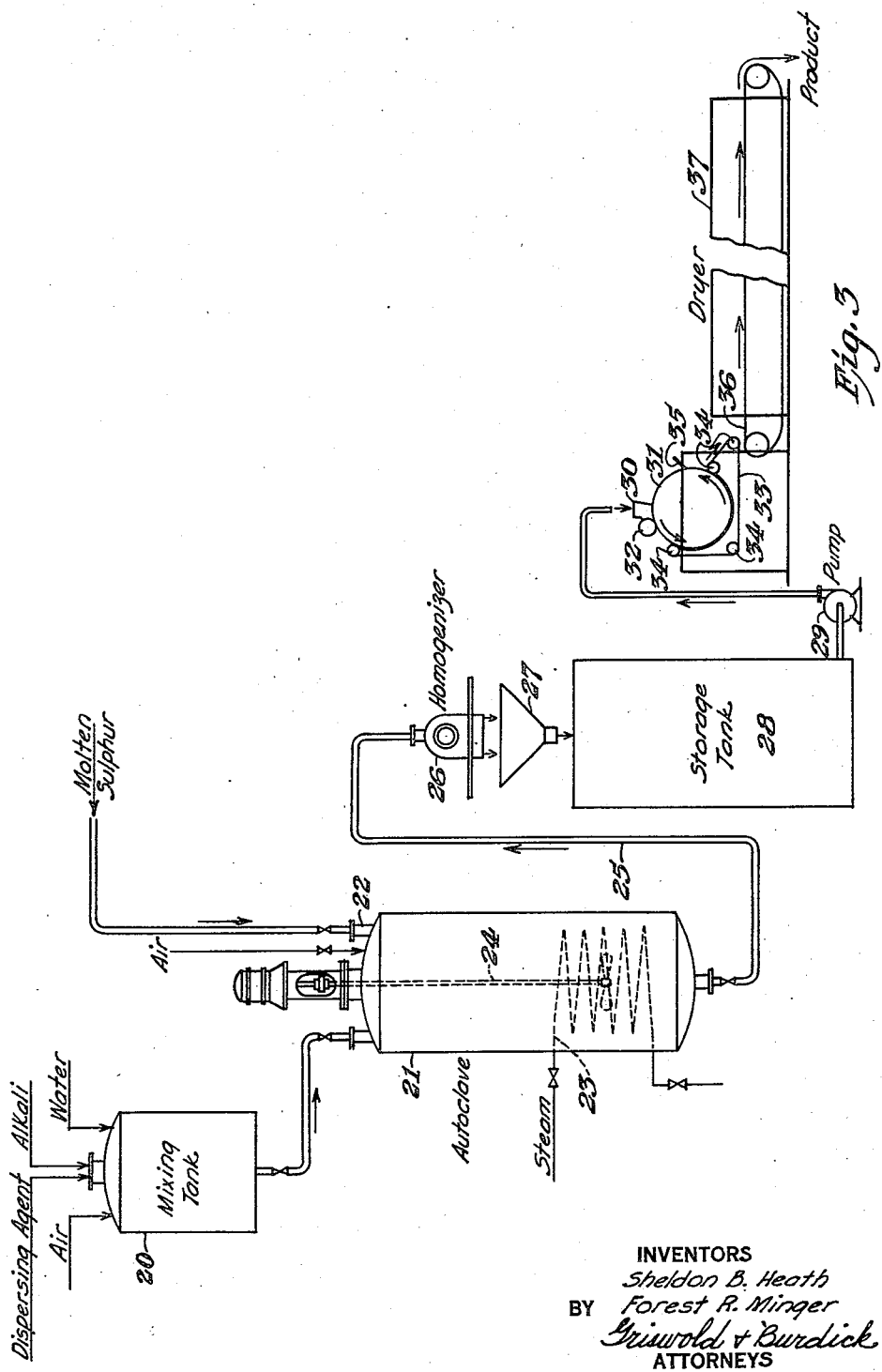

Patented Feb. 20, 1940

2,190,922

UNITED STATES PATENT OFFICE 2,190,922

METHOD OF COMMINUTING FUSIBLE MATERIALS SUCH AS SULPHUR

Sheldon B. Heath and Forest R. Minger, Midland, Mich., assignors to The Dow Chemical Company, Midland, Mich., a corporation of Michigan Application October 7, 1936, Serial No. 104,486

2 Claims. (Cl. 252—6)

The invention relates to methods of comminuting solid materials which are fusible at temperatures not greatly exceeding the boiling point of water. An example of such material is sulphur, and the invention is more particularly concerned with an improved method for making finely divided sulphur products which are adapted for use as an agricultural dust or spray and for other purposes, as well as with the improved product obtained thereby.

Specifically, there are various methods known to the art for making a finely divided form of sulphur. Chemical precipitation methods have been used which are capable of yielding a very finely subdivided product. However, the chemical costs of such processes are often uneconomically high, and the purification of the precipitated material adds further to the cost. Various mechanical methods have been described for treating raw sulphur to reduce it to a finely subdivided state, but all such methods heretofore proposed are subject to certain disadvantages and limitations. The direct grinding of solid sulphur, either by a dry or wet method, requires an excessive length of time, and, furthermore, is not practical for producing so fine a powder as is obtained by the precipitation methods. It has been proposed to supplement such mechanical grinding by further treatment of the ground material in various types of so-called colloid mills or homogenizers. All such methods, however, are uneconomical for preparing a product having the fineness of an impalpable powder, as well as being accompanied by serious mechanical difficulties of maintaining the apparatus. In some cases excessive pressures are prescribed, on the order of several hundred pounds per square inch or more. At the high pressures and speeds of usual homogenizing equipment, when employed for comminuting sulphur and similar materials, it is not feasible to maintain packing glands tight for any considerable length of time, and the apparatus suffers rapid deterioration.

A further proposal has been made to disperse molten sulphur in an aqueous medium by means of mechanical agitation, but here very high speeds are necessary to yield a product approaching the fineness of precipitated sulphur, and under such conditions it is not practical to maintain bearings and packing glands on the apparatus. In such methods also the time consumption is excessive.

It is among the objects of the present invention to provide a mechanical method for comminuting fusible materials, such as sulphur, which can be operated for long periods of time without serious deterioration of apparatus. Another object is to carry out such a method at moderate pressures. Another object is to secure a high rate of output, reducing the time factor to a small fraction of that of previous mechanical methods. Yet another object is to avoid the use of packing glands on the mechanical equipment when operated at speeds greater than a few hundred revolutions per minute.

A further object is to provide a method of the present character which is capable of comminuting raw sulphur to a degree of fineness comparable to that produced by chemical precipitation methods. It is also an object of the invention to make a sulphur product in the form of an impalpable powder which is light, fluffy, of low apparent density, easily wettable and readily dispersable in water, and which, when used as an agricultural dust or spray, is capable of adhering firmly to foliage.

The aforesaid and other objects of the invention are attained in the manner and by the means shown in the annexed drawings and hereinafter fully described in the following specification and particularly defined in the claims.

In said annexed drawings:

Fig. 3 is a diagrammatical representation of an arrangement of apparatus adapted for carrying out a preferred embodiment of the complete method or process of the invention.

We have found that an extremely finely divided sulphur product can be obtained by a method involving two principal stages in which the limitations and disadvantages hereinbefore mentioned are avoided. In the first stage molten sulphur is dispersed by moderately agitating with water at a temperature within the range of minimum viscosity of sulphur, e. g., between 120° and 160° C., and under the corresponding pressures of water vapor at the temperature employed. With the moderate degree of agitation employed mechanical difficulties do not arise. In this stage a preliminary dispersion or emulsion of molten sulphur in water is formed in which the particles of molten sulphur are reduced to a size on the order of about 10 to 20 microns. In the second stage the hot preliminary emulsion of molten sulphur and water is forced under pressure against the periphery of a high speed revolving rotor in a special type of homogenizing mill, which rotor exerts a counterforce against the stream of liquid emulsion, as well as an intense shearing action upon the dispersed liquid sulphur particles. The rotor is contained within a closely fitting casing, in which the clearance is preferably on the order of $\frac{1}{32}$ to $\frac{1}{8}$ inch. The pressure under which the hot emulsion is fed is in excess of the vapor pressure thereof, so as to maintain the aqueous fluid substantially in liquid phase and avoid the formation of vapor. The rate of feed of the molten sulphur emulsion is regulated so that the temperature of the material in the space at the periphery of the rotor is maintained above the melting point of sulphur by the heat contained in the hot emulsion, to which is added a certain amount of frictional heat produced by the rotor working against the pressure of the incoming liquid. The liquid droplets of sulphur in the suspension are disintegrated into particles of microscopic fineness by the shearing action of the rotor. From the peripheral space the liquid emulsion escapes radially through the lateral space between the rotor and its casing toward the center of rotation of the rotor, where it is discharged through an opening surrounding the rotor shaft. In passing from the periphery to the center of the apparatus both the pressure on, and temperature of, the sulphur emulsion fall to the point where the minute sulphur particles solidify, and are discharged in solid form, having a particle size as fine as from 1 to 3 microns or less, under proper operating conditions, such fineness being on the order of that of chemically precipitated sulphur. By feeding the preformed coarse sulphur emulsion at the periphery and discharging the fine emulsion at the center of the mill, the necessity is avoided of using a packing gland around the rotor shaft where it projects through the casing, and all the attendant difficulties of maintaining such packing gland are obviated.

Figure 1:
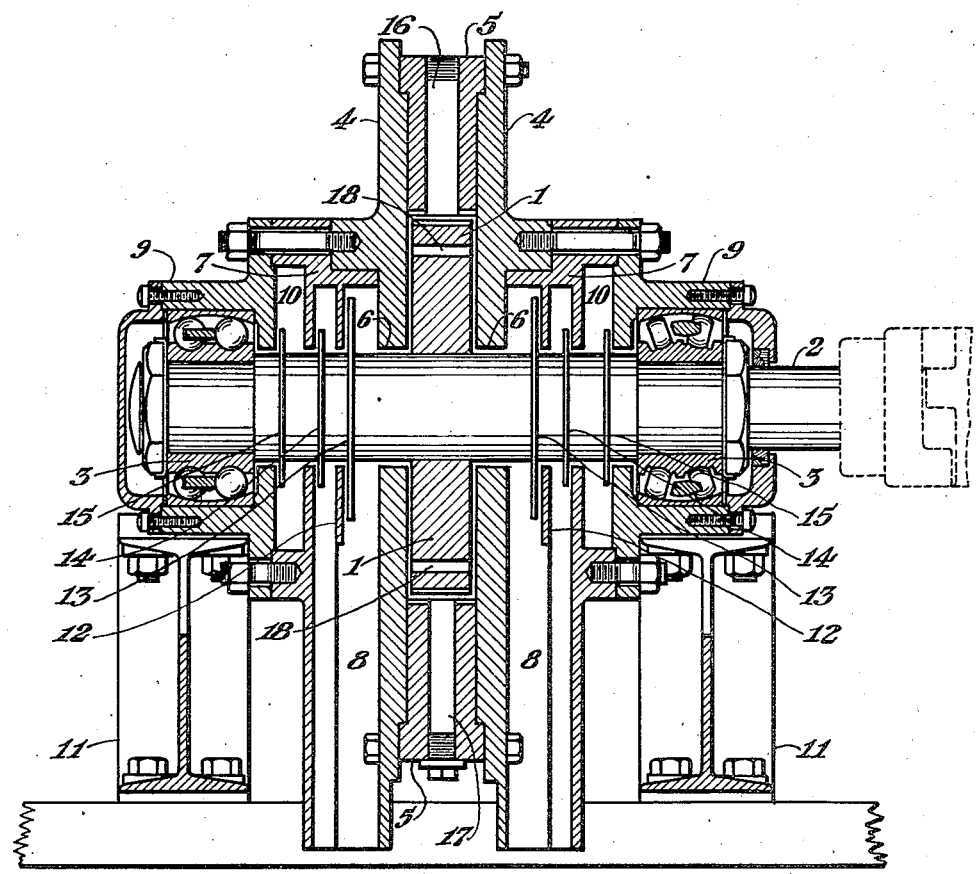
Fig. 1 is a cross-sectional view of a novel form of homogenizing apparatus adapted for use in the method of the invention.
Figure 2:
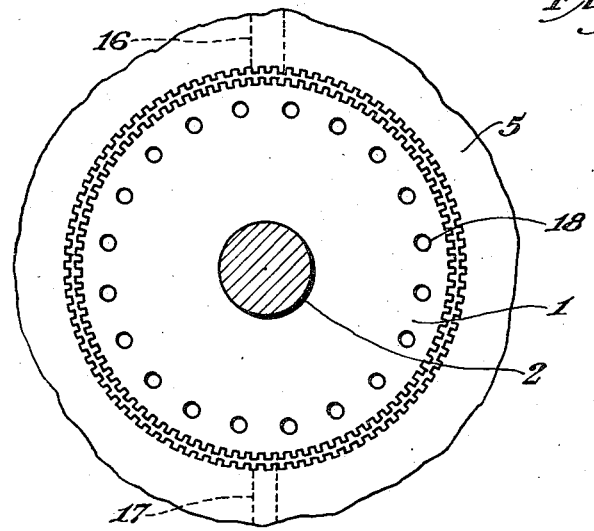
Fig. 2 is a detail view of a part of the apparatus shown in Fig. 1.

For a more particular description of our improved process and apparatus, reference is made to the drawings. Fig. 1 shows a transverse section of our improved form of homogenizing apparatus, while Fig. 2 is a side view of the rotor. Rotor 1 is mounted on a shaft 2 which is supported on bearings 3, 3. The rotor is enclosed by a casing which is composed of two side plates 4, 4 and a spacer ring 5 between them, the parts being tightly bolted together. Shaft 2 passes through central openings 6, 6 in side plates 4, 4, such openings being somewhat larger in diameter than the shaft. Against each side plate 4 is bolted a sealing plate 7, the two plates being spaced apart so as to form a discharge chamber 8 on either side communicating with the space inside of the rotor casing through shaft openings 6, 6, chambers 8 being closed at the top and sides, but open at the bottom. Outside of sealing plates 7 are attached bearing housings 9, 9 to support bearings 3, housings 9 being also spaced apart from plates 7 to leave chambers 10 therebetween. Floor supports 11, 11 for the apparatus are attached to the housings 9.

Within each chamber 8 is a baffle or splash plate 12. Attached to collars fastened to shaft 2 on either side of the rotor are three spinner rings 13, 14 and 15, bearing respectively against baffle 12, sealing plate 7 and the inner surface of housing 9, the function of which rings is to protect the bearings 3 against ingress of material discharged through the center opening 6 of the mill, as will be explained in greater detail hereinafter.

At the top and bottom of spacer ring 5 are inlet opening 16 and a drain 17, threaded for pipe connections. The inner circumference of ring 5 and the peripheral surface of rotor 1 are preferably notched or toothed, as shown in detail in Fig. 2. In the rotor 1 is a series of equally spaced holes 18 located equidistantly from the center near to the periphery, the purpose of which is to equalize pressure on the two faces of the rotor when in use. The particular apparatus described in the foregoing paragraphs is claimed in U. S. Patent No. 2,153,537, issued April 11, 1939, on a continuing and co-pending application filed by us on December 2, 1936, as Serial No. 113,843.

In the operation of the above described apparatus, the coarse liquid suspension or emulsion, which is to be further processed to reduce the size of the dispersed particles, is fed through inlet 16 under suitable pressure in excess of the vapor pressure of the liquid to overcome the centrifugal force exerted by the moving rotor, which revolves at high speed, e. g. 2000 to 4000 R. P. M. The material fed is subjected to an extreme shearing action of the high speed rotor under the pressure applied, which forces it from the peripheral space between rotor and casing into and through the lateral space to the discharge openings 6 around the shaft 2. The pressure, which is a maximum at the periphery, gradually falls as the discharge opening is approached, and is equalized on both faces of the rotor through the holes 18. The material discharged is still under an appreciable pressure, hence the baffles 12 and spinner rings 13, 14, 15 are provided to prevent any of the discharged material from traveling along the shaft and entering the bearings. The spinner rings fit closely against their respective bearing surfaces, but not necessarily tightly enough to develop any material friction. The discharged product falls down through the chamber or chute 8, whence it is delivered into a receiver placed therebelow. During operation, of course, the drain 17 is closed by a plug, being used only during shut-down periods for draining and cleaning the apparatus.

A preferred embodiment of our complete process for making a finely divided sulphur product is shown diagrammatically in Fig. 3. In a mixing tank 20 is made up an aqueous solution containing a small amount of alkali and a dispersing agent capable of dispersing sulphur in water, such solution being conveniently warmed to aid in dissolving the materials. The solution is then forced by air pressure to an autoclave 21, wherein it is mixed with molten sulphur added through inlet 22. Heat is supplied by steam coil 23 to keep the sulphur in molten condition, while the mixture is agitated by means of a direct-driven stirrer 24 operating at a moderate speed, e. g. 400 to 500 R. P. M. At such speed the maintenance of bearings and stuffing box presents no problems. Stirring is continued, at a temperature between about 120° and 160° C., until the molten sulphur has become thoroughly dispersed in, or emulsified with, the water, to form a coarse emulsion in which the particle sizes are on the order of about 10 to 20 microns.

When the hot aqueous emulsion is finished, it is forced by air pressure through a pipe 25 leading to a homogenizer 26 of the type hereinabove described. The autogenous pressure of the autoclave charge corresponds to that of water at the temperature involved, e. g. about 40 to 50 pounds per square inch gauge. Sufficient air pressure is required to force this charge into the mill 26 against the pressure developed therein by the rapidly revolving rotor, as well as to prevent vaporization of water. In practice the total pressure applied to the liquid in the mill 26 is about 70 to 80 pounds gauge. The hot sulphur-water emulsion fed to mill 26 is maintained therein in the peripheral space at a temperature above the melting point of sulphur, as already stated, by the combined heat of the liquid and the frictional heat of the mill. However, as soon as the liquid passes from the peripheral space to the lateral space and toward the discharge opening the temperature and pressure commence to fall, and the material under proper operation is discharged with the sulphur particles in substantially solid form. The spontaneous evaporation of water at the point of discharge, due to the release of pressure upon the liquid, aids materially in cooling the liquid and solidifying the sulphur particles. The wet material is discharged from the mill into a hopper 27 or the equivalent, and thence into a suitable receiver. Under proper operating conditions the sulphur particles in the product are reduced in size, on the average, to between 1 and 3 microns, or less.

The wet product discharged from the homogenizing mill, which may have a consistency similar to that of wet clay, is then dried to remove the remaining moisture. Such drying may be carried out in usual atmospheric drying equipment, at temperatures materially below the melting point of sulphur. An advantageous method of drying is shown diagrammatically in Fig. 3, which is adapted for handling the clay-like material and drying it rapidly and uniformly. The wet product from hopper 27, having a fluid consistency enabling it to be pumped, flows into a storage tank 28, from which it is pumped by a pump 29 to the feeder 30 of a cylindrical drum dryer. A preferred form of dryer, which is now commercially available, comprises an internally heated horizontal cylinder having closely spaced circumferential grooves on its face, such drum being indicated by 31. The liquid slurry is fed from feeder 30 on to the face of revolving drum 31 and compressed into the grooves by a roll 32 and held in place by traveling belt 33 running over a series of pulleys 34. The heat of the drum superficially dries and sets the material in the grooves, from which, as the drum revolves, it is continuously scraped or scooped out by lifters 35, the pieces or small solid chunks falling upon belt 33, whence they are fed to a traveling belt 36 of a hot air dryer 37. The solid pieces of partially dried material formed in the grooves of drum 31 are of uniform cross-section, hence can be air dried rapidly and uniformly in air dryer 37. The dried material discharged from dryer 37, which is in the form of loose, friable, easily crushed small pieces, is then crushed and pulverized in a hammer mill or the like in an atmosphere of inert gas, e. g. carbon dioxide. The pulverized material, after screening or air-classifying, is an impalpable powder, which can be packaged for shipment.

In making up a batch charge for the autoclave the proportions of materials can be varied considerably. The proportions of water and sulphur may vary from one-half part by weight to as much as 10 parts, or more, of water to one part of sulphur. It is advantageous, however, to employ as small a proportion of water as is practical, to simplify the recovery and drying of the sulphur product. In practice we prefer to use about equal parts of water and sulphur, or somewhat less water than sulphur. It is one of the advantages of our process that a much smaller proportion of water can be used than in other liquid phase processes of comminuting sulphur.

It is desirable to carry out the preliminary emulsification of water and sulphur in a weakly alkaline mixture, both to prevent the formation of corrosive acids and to promote the dispersion of the molten sulphur in the water. Hence, a small amount of an alkali is added to the water, ordinarily less than 1 per cent of the combined weights of water and sulphur. Any common alkali may be used, such as sodium hydroxide, carbonate, phosphate, silicate, or the corresponding potassium or ammonium compounds.

A dispersing or emulsifying agent is used, both to peptize the sulphur and promote the preliminary emulsification with water, and to aid in suspending the dried sulphur product in water in connection with its use as a spray material or for other purposes. A wide variety of dispersing agents may be used, such as those already known to the art. Examples of suitable dispersing agents are casein, albumin, tannin, gluten, sulphite waste liquor, glue, guano, etc. A relatively small amount of dispersing agent is sufficient, usually less than 1 per cent of the combined weight of water and sulphur.

Finely divided sulphur is not readily wetted by water, and in order to enable the finely powdered product of our process to be suspended easily in water for use as a spray a wetting agent is advisedly added to the mixture entering the process. Many wetting agents suitable for the purpose are known, examples of which are sulphonated vegetable, animal or mineral oils, such as Turkey red oil, sulphonated or sulphated higher alcohols and fatty acids, sulphonated aromatic derivatives, such as naphthalene and alkyl naphthalene sulphonic acids, sulphonated alkyl benzenes and phenols, etc., as well as salts of the above. A small amount likewise of the wetting agent is sufficient, usually less than 1 per cent of the combined weight of sulphur and water.

While the use of a wetting agent is important as regards the commercial application of the finely divided product, it has a disadvantage, in that such wetting agents apparently act as flocculating agents for the finely divided sulphur, causing the particles to coalesce or agglomerate to a certain extent, thereby counteracting the effect of the dispersing agent. We have found, however, that this flocculating action of the wetting agent may be suppressed by incorporating a small amount of a natural resin, such as gum arabic, benzoin, kauri, sandarac, rosin or guaiac, the amount used being about the same as that of the dispersing agent or wetting agent. A further advantage of the addition of a natural resin is that it makes a lighter and fluffier product, having a lower apparent density than an otherwise similar product containing no resin.

It will be understood that for reducing raw sulphur to an impalpable powder according to our improved method the above mentioned addition agents are not all indispensable. The dispersing agent is particularly advantageous in forming the preliminary emulsion of molten sulphur and water, and contributes to producing the extreme fineness of the product. The alkali prevents corrosion of the apparatus, but by making the latter of acid-proof metals the use of alkali could be dispensed with. The value of the wetting agent and resin lies in increasing the wettability and fluffiness of the product, these agents, however, not having any observed effect upon the physical reduction of the sulphur to a fine state of subdivision. Where the product is not desired for use as an aqueous suspension for a horticultural spray or similar purpose, the last mentioned agents may be omitted.

As a specific example of a product made according to the invention, 2500 pounds of molten sulphur, to which was added 12½ pounds of rosin, was mixed in an autoclave with 1500 pounds of water having dissolved therein 25 pounds of sodium hydroxide, 25 pounds of the dried residue of sulphite waste liquor and 3½ pounds of a wetting agent consisting of a sulphonated alkyl benzene compound. The mixture was heated to about 130° C. by means of a steam coil, and agitated with a 2 foot single blade propeller rotating at 400 R. P. M. for 20 minutes. The emulsified charge was then forced by air pressure into a homogenizing mill of the type hereinabove described, having a 12 inch diameter rotor with a 2 inch face operating at a speed of 3600 R. P. M. The total pressure at the periphery of the rotor was approximately 80 to 90 pounds gauge, i. e. above the autogenous pressure of the charge, at which pressure and corresponding rate of feed the temperature was maintained above the melting point of sulphur in the peripheral space. The total charge was passed through the mill in less than one-half hour. The wet product from the mill, containing about 20 per cent of moisture, was dried in an air drier, and the dried product pulverized in a hammer mill in which was maintained an atmosphere of carbon dioxide. The final product had a fineness of from 1 to 3 microns, an apparent density of 109 cubic inches per pound, and would wet completely and disperse in water in less than 30 seconds.

As will be seen from the foregoing example approximately one-half of the water in the original charge was evaporated upon release of pressure when the product was discharged from the homogenizing mill. Naturally such flash evaporation of water can be increased by discharging the product into a chamber maintained under reduced pressure by means of a vacuum pump.

Since the novel homogenizing mill herein described operates without packing glands on the shaft, and the bearings are effectively screened against access of the material being emulsified, the mill is free from the usual and most troublesome difficulties of apparatus heretofore used for comminuting sulphur and similar materials. The working pressures are moderate as compared with the pressures used in other processes of similar character, and no valves are employed which are subject to more or less rapid deterioration due to erosion and cutting.

A particular feature of our novel process is the maintenance of sulphur in molten condition during both the preliminary and final stages of comminution, solidification of the dispersed sulphur particles not taking place until, or just before, the dispersion is discharged from the homogenizing apparatus. This is advantageous for producing particles of the smallest size. By forcing the hot preliminary emulsion into the peripheral space of the homogenizing apparatus against the pressure generated by the revolving rotor a practically instantaneous comminution of the molten sulphur particles is brought about, reducing the particles to a smaller size in a shorter time than can be done with other types of colloid mills heretofore used. The apparatus has a high capacity in relation to its size, enabling a large output of material from a single unit in a short period of time.

Our improved sulphur product is a superior material for insecticidal or fungicidal use, having a degree of fineness equal to that of chemically precipitated sulphur, and at the same time having the dispersing and wetting agents physically incorporated within the individual particles, due to the method of manufacture, to a degree not feasible in the case of precipitated sulphur. The product has improved properties in respect to its lightness, wettability, slow settling from aqueous suspension, and adhesion to foliage and fruit.

Our improved method of comminuting sulphur is likewise applicable to preparing impalpable powders of other materials having similar physical properties to those of sulphur. The significant properties include the following: (1) brittle at ordinary temperature, (2) melting point near or somewhat above the boiling point of water, (3) insoluble in water. Examples of such materials are coal tar pitch, rosin, stearic acid, polymerized styrene, chlorinated naphthalene, etc.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:

1. The method of comminuting sulphur, which comprises intermixing molten sulphur with water in the presence of a dispersing agent under moderate agitation, while heating the mixture under pressure at a temperature above the melting point of sulphur to form a coarse liquid emulsion thereof, forcing such emulsion under pressure moderately in excess of its autogenous pressure into a zone of restricted area against an opposing centrifugal force, subjecting the emulsion in such zone to an intense mechanical shearing action, continuously expelling the fine liquid emulsion thereby formed under the applied pressure from said zone through a narrow passageway toward the center of generation of the centrifugal force, while progressively reducing the pressure and temperature of the emulsion to solidify the molten particles of sulphur, and discharging the fine suspension of substantially solidified sulphur particles from around the center of centrifugal force generation into a zone of lower pressure, whereby a substantial proportion of the suspending water is flash evaporated from the mixture.

2. The method of making an impalpable powdered sulphur product which comprises intermixing molten sulphur with water in the presence of a dispersing agent and of a relatively small amount of alkali under moderate agitation, while heating the mixture under pressure at a temperature above the melting point of sulphur to form a coarse liquid emulsion thereof, forcing such emulsion under pressure moderately in excess of its autogenous pressure into a zone of restricted area against an opposing centrifugal force, subjecting the emulsion in such zone to an intense mechanical shearing action, continuously expelling the fine liquid emulsion thereby formed under the applied pressure from said zone through a narrow passageway toward the center of generation of the centrifugal force, while progressively reducing the pressure and temperature of the emulsion to solidify the molten particles of sulphur, discharging the fine suspension of substantially solidified sulphur particles from around the center of centrifugal force generation into a zone of lower pressure, whereby a substantial proportion of the suspending water is flash evaporated from the mixture, drying the wet mass of particles thus discharged, and pulverizing the dried cake.

SHELDON B. HEATH.
FOREST R. MINGER.